US010623481B2

United States Patent
Snider et al.

(10) Patent No.: US 10,623,481 B2
(45) Date of Patent: Apr. 14, 2020

(54) BALANCING RESOURCES IN DISTRIBUTED COMPUTING ENVIRONMENTS

(71) Applicant: MICROSOFT TECHNOLOGY LICENSING LLC, Redmond, WA (US)

(72) Inventors: Matthew Snider, Redmond, WA (US); Anurag Gupta, Bellevue, WA (US); Lu Xun, Kirkland, WA (US); Yang Li, Redmond, WA (US); Gopal Kakivaya, Sammamish, WA (US); Hua-Jun Zeng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 14/852,233

(22) Filed: Sep. 11, 2015

(65) Prior Publication Data

US 2016/0316003 A1 Oct. 27, 2016

Related U.S. Application Data

(60) Provisional application No. 62/153,458, filed on Apr. 27, 2015.

(51) Int. Cl.
*G06F 9/455* (2018.01)
*H04L 29/08* (2006.01)
(Continued)

(52) U.S. Cl.
CPC ...... *H04L 67/1002* (2013.01); *G06F 9/45558* (2013.01); *G06F 9/505* (2013.01);
(Continued)

(58) Field of Classification Search
CPC .................. G06F 9/50–5094; G06F 9/45558–2009/45595
See application file for complete search history.

(56) References Cited

U.S. PATENT DOCUMENTS 7,165,108 B2  1/2007  Matena et al.
8,707,323 B2  4/2014  Galchev et al.
(Continued)

FOREIGN PATENT DOCUMENTS

CN  102388350 A  3/2012
CN  103226489 A  7/2013

OTHER PUBLICATIONS

"International Search Report and Written Opinion Issued in PCT Application No. PCT/US2016/27709", dated Jul. 5, 2016, 12 Pages.
(Continued)

*Primary Examiner* — David R Lazaro
*Assistant Examiner* — Julian Chang
(74) *Attorney, Agent, or Firm* — Shook, Hardy & Bacon, LLP

(57) ABSTRACT

In various implementations, methods and systems resource balancing in a distributed computing environment are provided. A client defined resource metric is received that represents a resource of nodes of the cloud computing platform. A placement plan for job instances of service applications is generated. The placement plan includes one or more movements that are executable to achieve a target placement of the job instances on the nodes. It is determined that the placement plan complies with placement rules. Each placement rule dictates whether a given job instance of the job instances is suitable for placement on a given node of the nodes. The placement plan is executed based on determining that the target placement of the job instances improves balance of resources across the nodes of the cloud computing platform based on the resource represented by the client defined resource metric.

19 Claims, 6 Drawing Sheets

(51) Int. Cl.
*H04L 12/911* (2013.01)
*G06F 9/50* (2006.01)
(52) U.S. Cl.
CPC ............ *G06F 9/5077* (2013.01); *H04L 47/70* (2013.01); *G06F 2009/4557* (2013.01)

(56) References Cited

U.S. PATENT DOCUMENTS

| | | | |
|---|---|---|---|
| 8,713,564 B2 | 4/2014 | Rosu et al. | |
| 8,826,292 B2* | 9/2014 | Heim | G06F 9/5088 718/1 |
| 2006/0167984 A1* | 7/2006 | Fellenstein | G06F 9/5072 709/203 |
| 2009/0193414 A1 | 7/2009 | Broussard et al. | |
| 2010/0058352 A1* | 3/2010 | Esfahany | G06F 9/505 718/105 |
| 2010/0211956 A1* | 8/2010 | Gopisetty | G06F 9/5088 718/104 |
| 2011/0225277 A1* | 9/2011 | Freimuth | G06F 9/45558 709/223 |
| 2011/0238826 A1* | 9/2011 | Carre | H04L 41/5009 709/224 |
| 2012/0005505 A1* | 1/2012 | Tolia | G06F 1/206 713/320 |
| 2012/0151474 A1* | 6/2012 | Biran | G06F 9/45558 718/1 |
| 2012/0174097 A1* | 7/2012 | Levin | G06F 9/5077 718/1 |
| 2012/0324112 A1 | 12/2012 | Dow et al. | |
| 2013/0019009 A1* | 1/2013 | Tremblay | G06Q 30/02 709/224 |
| 2013/0080619 A1* | 3/2013 | Assuncao | G06F 9/45558 709/224 |
| 2013/0178991 A1* | 7/2013 | Gheerardyn | G05B 13/02 700/286 |
| 2013/0227566 A1* | 8/2013 | Higuchi | G06F 9/45533 718/1 |
| 2013/0325906 A1* | 12/2013 | Qiu | G06F 17/303 707/803 |
| 2014/0068077 A1* | 3/2014 | Hadad | G06F 9/5027 709/226 |
| 2014/0223122 A1* | 8/2014 | Butt | G06F 9/5088 711/162 |
| 2014/0317265 A1* | 10/2014 | James | H04L 67/1004 709/224 |
| 2014/0344440 A1* | 11/2014 | Dutta | H04L 41/0823 709/224 |
| 2015/0007176 A1* | 1/2015 | Kotani | G06F 9/45533 718/1 |
| 2015/0039764 A1* | 2/2015 | Beloglazov | H04L 47/70 709/226 |
| 2015/0106520 A1* | 4/2015 | Breitgand | G06F 9/45558 709/226 |
| 2015/0120931 A1* | 4/2015 | Padala | G06F 9/5027 709/226 |
| 2015/0244796 A1* | 8/2015 | Joy | H04L 67/1095 709/203 |
| 2015/0248305 A1* | 9/2015 | Shu | G06F 9/45558 718/1 |
| 2015/0331703 A1* | 11/2015 | Kelly | G06F 9/45558 718/1 |
| 2016/0011925 A1* | 1/2016 | Kulkarni | H04L 43/0817 714/57 |
| 2016/0021024 A1* | 1/2016 | Parikh | G06F 9/45558 709/226 |
| 2016/0034307 A1* | 2/2016 | Wilkinson | G06F 9/5038 718/104 |
| 2016/0085593 A1* | 3/2016 | Anderson | G06F 9/45558 718/1 |
| 2016/0103717 A1* | 4/2016 | Dettori | G06F 9/542 719/318 |
| 2016/0139946 A1* | 5/2016 | Gardner | G06F 9/45558 718/1 |
| 2016/0203026 A1* | 7/2016 | Simitsis | G06F 9/38 718/104 |
| 2016/0226789 A1* | 8/2016 | Sundararajan | G06F 9/5083 |
| 2016/0239331 A1* | 8/2016 | Tamura | G06F 9/45558 |
| 2016/0243766 A1* | 8/2016 | Arisoy | G05B 19/4099 |
| 2016/0300188 A1* | 10/2016 | Hosoda | G06Q 50/28 |
| 2016/0313019 A1* | 10/2016 | Mengle | F24F 11/006 |
| 2016/0314014 A1* | 10/2016 | Dow | G06F 9/45558 |
| 2017/0278087 A1* | 9/2017 | Beda, III | H04L 43/0876 |
| 2017/0302523 A1* | 10/2017 | Shah | H04L 41/0893 |

OTHER PUBLICATIONS

Gulati, et al., "Vmware Distributed Resource Management: Design, Implementation, and Lessons Learned", In the Journal of the VMware Technical, vol. 1, Issue 1, Mar. 2012, pp. 45-64.

Jayasinghe, et al., "Improving Performance and Availability of Services Hosted on IaaS Clouds with Structural Constraint-Aware Virtual Machine Placement", In IEEE International Conference on Service Computing, Jul. 4, 2011, pp. 72-79.

Xu, et al., "Multi-Objective Virtual Machine Placement in Virtualized Data Center Environments", In IEEE/ACM International Conference on Green Computing and Communications and Cyber, Physical and Social Computing, Dec. 18, 2010, pp. 179-188.

Hyser, et al., "Autonomic Virtual Machine Placement in the Data Center", In the Technical Report—Hewlett Packard Laboratories, Feb. 26, 2008, 10 Pages.

Mills, et al., "Comparing VM-Placement Algorithm for On-Demand Clouds", In IEEE Third International Conference on Cloud Computing Technology and Science, Nov. 29, 2011, pp. 91-98.

"Office Action Issued in European Patent Application No. 16717824.3", dated Oct. 31, 2018, 4 Pages.

"First Office Action Issued in Chinese Patent Application No. 201680025482.3", dated Nov. 19, 2019, 25 Pages.

* cited by examiner

BALANCING RESOURCES IN DISTRIBUTED COMPUTING ENVIRONMENTS

CROSS-REFERENCE TO RELATED APPLICATION

The present application claims priority to U.S. provisional application Ser. No. 62/153,458, filed Apr. 27, 2015, and titled "BALANCING RESOURCES IN DISTRIBUTED COMPUTING ENVIRONMENTS," which is hereby incorporated herein by reference in its entirety.

BACKGROUND

Cloud computing platforms may offer building, deployment and management functionality for different types of applications. A cloud computing platform can include many large scale data centers that typically comprise organized clusters of hardware running collections of software packages, such as web servers, database servers, and the like. A cloud computing platform can supply a set of hosted resources such as processors, operating systems, software and other components that can be made available to applications of clients of the cloud computing platform. Clients can request instantiation of the applications from a central server or management system. For example, a client may wish to set up and instantiate a virtual server from the cloud to create a storefront to market products or services. The user can lease or subscribe to the set of resources to build and run the instantiated applications using those predefined resources.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The present disclosure is directed, in part, to balancing resources in a distributed computing environment, such as on a cloud computing platform. In some respects, the present disclosure relates to generating and selecting placement plans for service applications on cloud computing platforms. Each service application may comprise one or more job instances that are placed on nodes of the cloud computing platforms so that the job instances may consume resources that are available on those nodes. Suitable placement plans can be effectively and efficiently generated despite a potentially large number of factors that may need to be considered in selecting and generating a placement plan to execute on a cloud computing platform.

In some respects, the present application relates to generating and selecting placement plans for job instances that improve balance of the resource metrics across the nodes of a cloud computing platform. Each resource may be represented by a respective resource metric. In some cases, at least some of the resource metrics can be client defined and may be allocated to the job instances by the client. Others of the resource metrics may be system defined.

In further respects, the present application relates to generating and selecting placement plans for job instances that comply with placement rules which dictate whether a given job instance is suitable for a given node. In some cases, at least some of the placement rules can be client defined and may be dynamically changed by the client during the operation of the cloud computing platform. Others of the placement plans may be system defined.

BRIEF DESCRIPTION OF THE DRAWINGS

The present invention is described in detail below with reference to the attached drawing figures, wherein.

DETAILED DESCRIPTION

Figure 1:
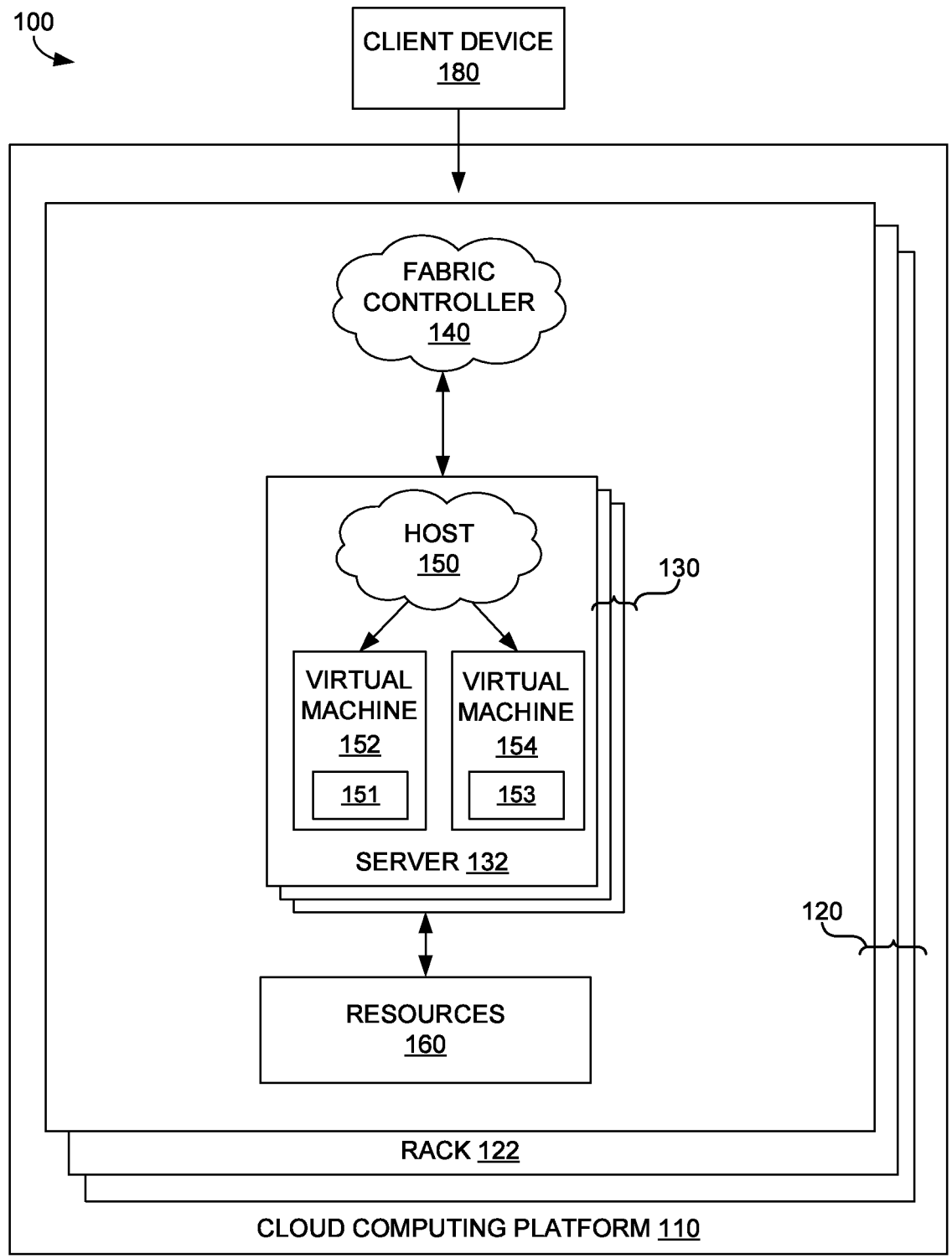
FIG. 1 is a block diagram of an exemplary distributed computing environment in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to a node and client device operating environment supported by a cloud computing platform, the node and client device operating environment includes client devices utilizing applications and services on the cloud computing platform. However, the methods described herein can be performed in different types of operating environments having alternate configurations of the functional components described herein. As such, the embodiments described herein are merely exemplary, and it is contemplated that the techniques may be extended to other implementation contexts.

A distributed storage system can be implemented on a cloud computing platform that runs cloud applications and services across different data center and geographic regions. The cloud computing platform can implement a fabric controller component for provisioning and managing resource allocation, deployment/upgrade, and management of cloud applications and services. Typically, a cloud computing system acts to store data or run applications and services in a distributed manner. The application and service components of the cloud computing platform may include nodes (e.g., computing devices, processing units, or blades in a server rack, virtual machines, physical machines) that are allocated to run one or more portions of applications and services that are also referred to herein as "jobs." As used herein, a "node" refers to a conceptual unit representing a defined pool or grouping of computing resources.

Computing resources are provided by physical machines, such as servers, which may be partitioned into virtual machines or physical machines that concurrently run the separate service applications, respectively, in individualized computing environments that support the resources and/or operating system specific to each service application. Further, each application or service may be divided into jobs such that each functional portion is able to run on a separate machine (either physical or virtual). In cloud computing platforms, multiple servers may be used to run the applications and services to perform data storage operations in a cluster. In particular, the servers may perform data operations independently but exposed as a single device referred to as a cluster. Each node may correspond to one or more servers and/or virtual machines in the cluster.

A storage service on the cloud computing platform can be a service supported using the fabric controller component. The storage service can be responsible for managing the replication and data placement for jobs across disks and resource balancing the data and the application traffic with storage clusters. The storage service can be responsible for managing access to a high volume of storage. The storage service can implement a storage stamp as a cluster of N racks of storage nodes or servers and a location service that manages the storage stamps. Specifically the location service can allocate location stamps and manage them across the storage stamps for disaster recovery and resource balancing.

A cloud computing platform supporting a storage service can support several different clients simultaneously requesting access to the same data (e.g., file or Binary Large Object (BLOB)) or portions of the same data (e.g., a chunk of data), requesting that new service applications be instantiated, providing resource allocations/demands for service applications, and changing resource allocations/demands for instantiated service application. Storage services can limit access to particular data for resource balancing and other resource allocation purposes.

Conventional cloud computing platforms may provide a simplistic and generic representation of resources to simplify resource balancing or avoid resource balancing altogether due to difficulties in sufficiently balancing resources when a large number of factors affect the balance on the platform. Further, these cloud computing platforms lack a robust and dynamic environment in which clients can express requests, demands, and requirements for their applications that may change over time.

Embodiments of the present disclosure provide balancing of resources in an effective and efficient manner despite a potentially large number of factors that may need to be considered in a cloud computing platform. The resources can be balanced based on resource metrics that are defined by clients and/or the system. Further the resources can be balanced while respecting placement rules that are defined by clients and/or the system. Allocations of the resources to applications, as well as the resources themselves, can be changed by the client dynamically, while the applications are running on the platform. The placement rules for the applications can similarly be changed dynamically. The cloud computing platform's notions of proper placement of job instances and resource balance also changes dynamically as different clients provide different or modified placement rules, resources, and allocations to the platform.

Referring now to FIG. 1, FIG. 1 illustrates an exemplary distributed computing environment 100 in which implementations of the present disclosure may be employed. In particular, FIG. 1 shows a high level architecture of comprising cloud computing platform 110. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

It is noted that any number of components may be employed to achieve the desired functionality of distributed computing environment 100 within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Cloud computing platform 110 comprises cloud computing infrastructure that runs cloud services across different data centers and geographic regions. Data centers can support a plurality of racks 120, each including one or more servers. For example, FIG. 1 shows rack 122 including servers 130, of which server 132 is individually labeled. Cloud computing platform 110 can implement fabric controller 140, which is a component for provisioning and managing resource allocation, deployment/upgrade, and management of cloud services.

Typically, cloud computing platform 110 acts to store data or run service applications in a distributed manner. Cloud computing platform 110 may comprise any combination of a public cloud, a private cloud, or a dedicated cloud. Cloud computing platform 110 may include a data center configured to host and support operation of endpoints in a particular application or service. The terms service application, application, or service are used interchangeably herein and broadly refer to any software, or portions of software, that runs on top of, or accesses storage and compute device locations within a datacenter.

In distributed computing environment 100, servers, such as servers 130, are included in racks, such as rack 122. The servers are allocated to run one or more portions of a tenant's service applications. A server can be provisioned with a host (e.g., operating system or runtime environment), such as host 150, running a defined software stack on the server. The servers can also be configured to perform specialized functionality (e.g., compute servers or storage servers) within cloud computing platform 110. Service application components of cloud computing platform 110 that support a particular customer, client, or tenant, can be referred to as a tenant infrastructure or tenancy.

When separate service applications are being supported by the servers of distributed computing environment 100, at least some of the servers may optionally be partitioned into virtual machines (e.g., virtual machine 152 and virtual machine 154) that can concurrently run separate service applications. As used herein, a "machine" may refer to a virtual machine or a physical machine, unless specified otherwise. The machines can be configured as individualized computing environments that are supported by resources 160 (e.g., hardware resources and software resources) in cloud computing platform 110. Nodes of cloud computing platform 100 are defined to divide up the resources cloud computing platform 100 (e.g., resources 160). A node can correspond to one or more physical and/or virtual machines, examples of which is shown by nodes 151 and 153 in FIG. 1. In some cases, each virtual machine corresponds to a node. It is contemplated that resources can be configured for specific service applications. Further, each service application may be divided into functional portions, or jobs, such that each functional portion is able to run on a separate machine, or node. In cloud computing platform 110, multiple machines may be used to run service applications and perform data storage operations in a cluster. In particular, the machines may perform data operations independently but exposed to the client as a single device referred to as a cluster.

In some cases, a service application or a portion thereof may correspond to a job of the service application, and one or more instances of a job may be concurrently hosted on cloud computing platform 110. As used herein, the term "job" may generally correspond to a component program for carrying out particular functional aspects of a service application and a "job instance" may correspond to an instantiation of a job. In this respect, an instance of a service application can comprise one or more job instances.

In some respects, a job can optionally be implemented using a corresponding template description of a functional portion of the service application. The template description can comprise one or more of an indication of computer code to implement or instantiate the job, conditions within the hosting environment that are required by the job, configuration settings to be applied to the job, and the job's set of endpoints for communication with other jobs, elements, etc. In some cases, a job's configuration settings may include collective settings which are shared by all instances of the job, or individual settings that are particular to each instance of the job. In exemplary embodiments, the jobs each represent a particular class of component of the service application. Typically, a service model delineates how many instances of each of the one or more jobs to place within nodes, where each of the instances is a replication of the particular class of component, or job. In other words, each job may represent a collection of instances of each class of components, where the service application may have any number of classes of components for carrying out functions thereof.

In some implementations, multiple instances of a service application can concurrently be hosted on cloud computing platform 110. In some aspects of the present disclosure, one or more of the instances may be primary instances of the service application and one or more of the instances may be secondary instances of the service application. A primary instance of an application may refer to an active or live instantiation of the application and a secondary instance of an application may refer to a backup or replica of an active or live instantiation of the application (e.g., a corresponding primary instance). Each primary instance of an application may have any number of associated secondary instances of the application including no secondary instances. In this respect, a primary instance of an application may comprise one or more primary job instances and a secondary instance of the application, if present, may comprise one or more secondary job instances.

Although fabric controller 140 is shown discretely in FIG. 1, in some implementations, fabric controller 140 is a stateful application that is distributed across any of the various nodes of cloud computing platform 110. In other words a number of fabric controller job instances may be running in various nodes, racks, data centers, and/or geographic regions of cloud computing platform 110, and may act in conjunction to achieve its functionality. Furthermore, one or more of the instances may be elected as primary instances and one or more others may be secondary instances.

Clients, also referred to as tenants herein, may employ client devices, such as client device 180 that may be linked to one or more service applications in cloud computing platform 110. A client device may be any type of computing device, which may correspond to computing device 600 described with reference to FIG. 6, for example. A client device can be configured to issue commands to cloud computing platform 110, as well as provide information for template descriptions of jobs associated with the client, including configuration settings for one or more of the jobs. In embodiments, the client device may communicate with service applications through a virtual Internet Protocol (IP) and resource balancer or other means that directs communication requests to designated endpoints in cloud computing platform 110. The components of cloud computing platform 110 may communicate with each other over a network (not shown), which may include, without limitation, one or more local area networks (LANs) and/or wide area networks (WANs).

Figure 2:
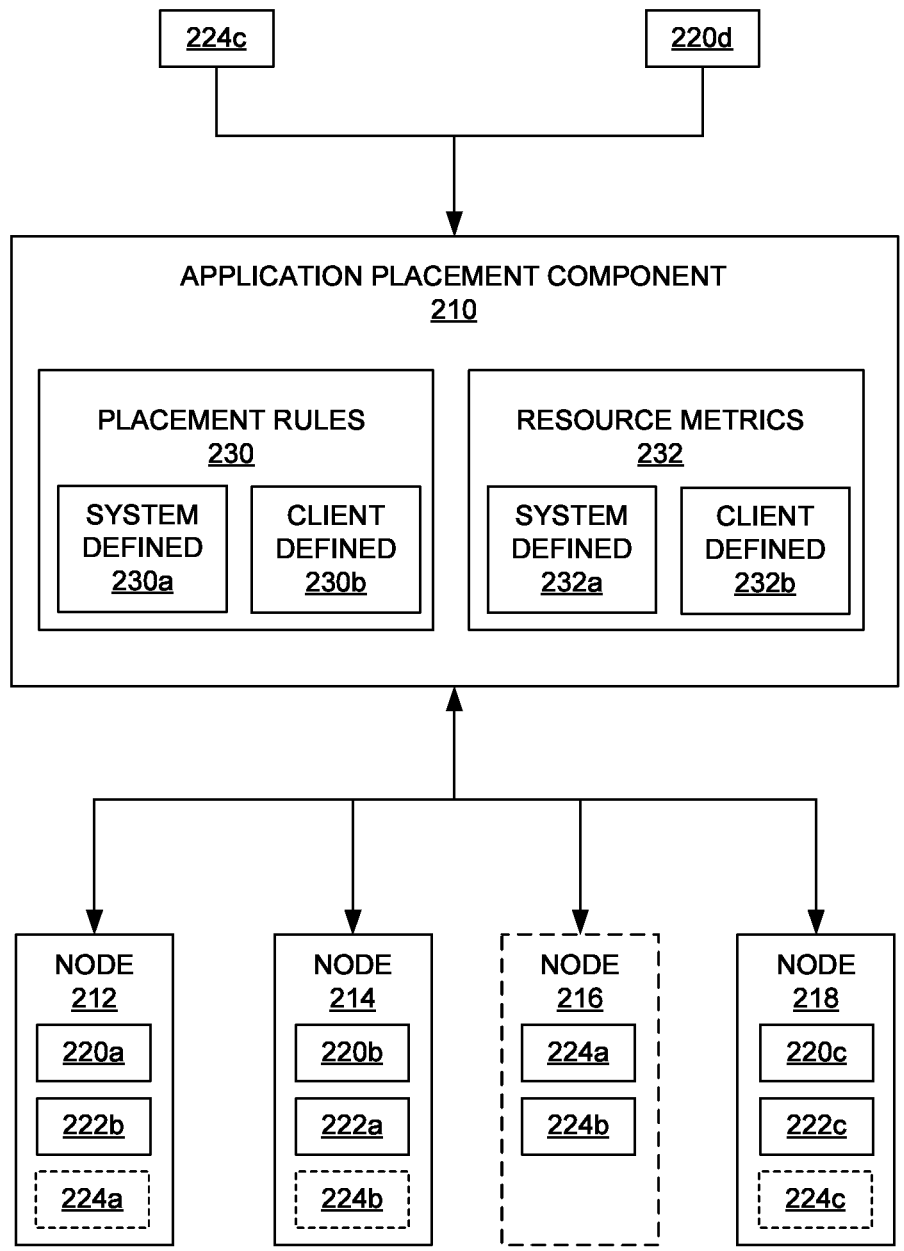
FIG. 2 is a schematic of an exemplary system for balancing resources in a distributed computing environment, in accordance with embodiments described herein.

Referring now to FIG. 2, FIG. 2 illustrates exemplary system 200 for balancing resources in a distributed computing environment. The distributed computing environment can correspond to distributed computing environment 100 of FIG. 1. Thus, nodes 212, 214, 216, and 218 in FIG. 2 can correspond to any of the various nodes of distributed computing environment 100, such as servers 130 and/or virtual machines 152 and 154, and/or other nodes. System 200 includes application placement component 210, which is configured to select nodes for placement of job instances of service applications, such as job instances 220a, 220b, 220c, 220d, 222a, 222b, 222c, and 224a, 224b, and 224c.

The job instances can be placed on the selected nodes where a placed job instance may consume any of the various resources of its corresponding node. In particular, each node has respective resources (e.g., of resources 160 in FIG. 1), which are available to be consumed by one or more job instance placed on the node. However, effectively utilizing resources of a cloud computing platform while effectively serving the needs of clients and their service applications, as well as the needs of the system itself, can introduce a plethora of factors into the decision of where to optimally place the job instances. These factors can quickly balloon such that determining optimal placement becomes an NP-hard problem.

At a small scale, placement decisions may still be made in an acceptable amount of time using an acceptable amount of computational resources. However, in a large cloud computing platform with many nodes, job instances, data centers, and/or clients, the amount of time and computational resources required can quickly become prohibitive. For example, the factors considered in the placement decisions may be constantly changing and evolving, such that by the time an optimal placement is determined and executed, the configuration may no longer be optimal for the current state of the system. Conventional cloud computing platforms avoid this problem by greatly limiting and predefining the number and types of factors considered, and the scale of the platform.

In accordance with various implementations of the present disclosure, application placement component 210 can place job instances while effectively and efficiently serving the needs of job instances, clients, and the system itself even while considering a large number of factors on a large scale cloud computing platform. As will later be described in additional detail, application placement component 210 may not necessarily always select optimal placement plans with respect to these factors, but may still select near optimal and effective placement plans. Further, the placement plans can be determined quickly using a limited amount of computational resources, so as to meet the demands of the distributed computing environment.

Below some examples of various factors are described, any combination of which may be considered by application placement component 210 in placing job instances. Accounting for such factors may be unachievable or highly impractical if application placement component 210 were to utilize conventional approaches in placing the job instances.

In various implementations, application placement component 210 can generate placement plans for job instances based on placement rules, such as placement rules 230 and resource metrics, such as resource metrics 232. Each resource metric defines and quantifies a respective resource in the cloud computing platform. Further, each placement rule can dictate whether a given node is suitable for a given job instance. In placing job instances, application placement component 210 may select nodes for job instances to comply with the placement rules and further to achieve balance of resource utilization by the nodes across the platform.

Balancing resources provides many potential benefits to the cloud computing platform. Poor resource balancing or changing conditions in a cloud computing platform can result in skew problems, where the utilization of resources of some nodes is significantly larger than others. For example, heavily utilized nodes, or hot nodes, are more prone to failure and sources of bottlenecks, which can be alleviated by offloading work to underutilized nodes, or cold nodes, that are being paid for to sit relatively idle. Furthermore, by spreading out resource utilization, it is less likely that a single failure can take down a majority of workloads on the platform. Effective placement of job instances may then entail, in part, ensuring that job instances are placed on nodes such that resource utilization is balanced across the nodes for each of the resources.

A resource metric comprises information utilized by application placement component 210 to quantify utilization of nodes with respect to a given resource. For example, a resource metric can quantify actual and/or requested utilization of a given resource of a node by a job instance. In some cases, application placement component 210 may determine whether a given node can sufficiently serve a given job instance with respect to the resource metric. In various implementations, application placement component 210 employs resource metrics 232 to balance the corresponding resources they define across the nodes of the cloud computing platform.

Using some approaches, the number of factors considered by application placement component 210 in resource balancing could be limited by representing resources in the system using finite and predefined resource definitions that are highly abstracted from the variety of actual resources a job instance/application may demand. For example, using a single resource called a work unit, each job instance could have a desired number of work units and each node could have a maximum capacity of work units that can be supplied by that node. Thus, the job instances could optimally be placed onto the nodes in a straightforward manner due to the low amount of variables. However, such an approach is prone to overallocating actual resources to job instances and not effectively balancing those resources, unless the job instances are highly homogenous in resource utilization. For example, the work unit resource could encapsulate both a central processing unit (CPU) resource and a disk space resource. Thus, a job instance that demands low CPU utilization and medium disk space may be allocated the same amount of resources as a job instance that demands high CPU utilization and medium disk space. As such, nodes may become underutilized with respect to certain resources.

In accordance with various implementations of the present disclosure, using resource metrics, application placement component 210 can place job instances on nodes that are representative of actual resources demanded by the job instances and clients, while not being limited to finite and predefined resources. Exemplary resource metrics correspond to a CPU resource, a disk space resource, a memory (e.g., RAM) resource, a GPU resource, live traffic volume, a work queue depth resource, and network bandwidth. However, the resources that application placement component 210 can balance are not so limited. In various implementations, resource metrics 232 can comprise a substantially arbitrary number of resources metrics that can define arbitrary types of resources.

In some respects, resource metrics utilized for resource balancing can comprise one or more system defined resource metrics and/or one or more client defined resource metrics. For example, resource metrics 232 comprises system defined resource metrics 232a and client defined resource metrics 232b. By allowing for both system and client defined resources, the cloud computing platform can more effectively serve the needs of clients and their service applications. For example, the platform can effectively serve as a generic application platform that does not require specific knowledge and design for the variety of types of applications that may be running thereon or might run thereon in the future, while still effectively allocating and distributing resources to those applications.

Each client defined resource metric may be associated with one or more clients, and each client can employ a different set of client defined resource metrics. Further, in some cases, each job, service application, or instance thereof can employ a different set of client defined resource metrics. In some implementations, client defined resource metrics can be defined by a client designating the resource of a resource metric for one or more job instances. For example, a set of resource metrics may be specifically designated for a particular job instance(s), for a particular service application instance (i.e., for all job instances of the application), for all primary instances of a job and/or service application, for all secondary instances of a job and/or service application, and/or for all instances of a service application.

Thus, different job instances and/or service application instances can have different sets of resource metrics designated for them depending on their needs. In some cases, a resource metric is designated by the client specifying a resource metric identifier in association with the job and/or service application (or instance thereof). The designation may optionally assign a priority to the metric relative to other resource metrics. Further, the designation may optionally define a utilization demand, or default, for the job/application. A primary instance utilization demand, or default, may optionally be specified separately from a secondary instance utilization demand. Application placement component 210 can employ the utilization demands, or defaults, to predict the balance of resources on the platform in placing the jobs instances so as to accesses whether a potential placement plan is balanced with respect to the resources.

As a specific example, in some cases, the client may designate a resource metric using the following format ServiceApplicationName service application -Metric "Metric1, Priority, PrimaryUtilization, SecondaryUtilization." In this example, ServiceApplicationName is an identifier of a service application and application is an identifier of an instance of the service application that is a subject of the designation. It should be appreciated that identifiers used may be for the element being designated. Thus, a job instance identifier could be used where the job instance is being identified. -Metric specifies that a resource metric is being designated for the service application instance and Metric1 is an identifier for the resource metric. Priority is a value corresponding to the priority of the resource metric with respect to other resource metrics (e.g., high, medium, low). The priority can optionally be employed by application placement component 210 in selecting job instance placement, as will later be described in further detail. PrimaryUtilization is a value (e.g., numerical) representing an amount of the resource of the resource metric demanded for the primary service application instance, and SecondaryUtilization is a value (e.g., numerical) representing an amount of the resource of the resource metric demanded for any secondary service application instances. It will be appreciated that primary and secondary utilization demands need not be specified separately, but doing so can allow for primary and secondary instances to have different demands. For example, a secondary instance may have lower CPU demands than a corresponding primary instance.

In addition to or instead of the client specifying utilization in designating resource metrics to job instances, in some implementations, the job instances can report utilization of a resource of a resource metric while being served on a node. For example, job instances on each node may report resource utilization of client defined resource metrics (and optionally system defined resource metrics) to their corresponding node (possibly via their corresponding machine), which may in turn report individual or aggregated resource utilization for resource balancing decisions to be made by application placement component 210. In some cases, the utilization is reported to the host on the node (e.g., host 150), which reports the individual or aggregated resource utilization on the node to a collection component. The collection component may in turn report the information to other instances or portions of the collection component amongst the hierarchy of the cloud computing platform. For example, a chain of reports and/or aggregations may flow up a node/rack/database/region/country hierarchy amongst collection components at each level as needed for resource balancing decisions.

In some implementations, utilization of client defined resource metrics by job instances and/or priorities thereof can change and be updated over time. For example, the client may designate new utilizations for one or more job instances and provide such designations to the platform. Such designation may optionally be in the format described above, or may take another form. In addition, or instead, updates or changes to utilization can be reported by one or more job instances. For example, each job instance can include internal logic for determining and/or reporting utilization of one or more resources by the job instance. The reported utilization can changes over time, as reflected in one or more reports provided by the job instance (e.g., to the node). In some cases a report may be provided on the initiative of the job instance, for example, responsive to the utilization by the job instance changing and/or after a predetermined period of time. Further, a report may be provided by a job instance upon being polled for utilization, for example, by the node.

System defined resource metrics may optionally be designated for job instances similar to client defined resource metrics. However, in some implementations, at least some of the resources represented by system defined resource metrics may not be reported by the job instances. As an example, each machine of a node may measure resource utilization and report the utilization to a host of a node. By utilizing combinations of system defined resource metrics and client defined resource metrics, as well as providing for changes to those demands and definitions, the cloud computing platform can provide flexible resource balancing that can adapt to changing needs of clients and applications.

As described above, application placement component 210 can consider placement rules in placing job instances on nodes. Each placement rule can comprise one or more conditions that can be evaluated with respect to a potential placement or movement of a job instance on a node. A placement or movement may comply with a placement rule where the one or more conditions are met. As with resource metrics, placement rules can be system and/or client defined. For example, placement rules 230 includes system defined placement rules 230a and client defined placement rules 230b. As with resource metrics, placement rules can be designated for a particular job instance(s), for a particular service application instance (i.e., for all job instances of the application), and/or for all instances of a service application (or for all primary or secondary instances). Furthermore, placement rules can change and be updated, added to, or replaced over time by the system and/or clients.

A placement rule may ensure utilization of one or more resources are under capacity for each node (where a capacity is defined for the resource). As an example, each node may have defined capacity for utilization of one or more resources on the node. Various capacities may be defined by the system and/or client and may be machine and/or node specific. For example, nodes may be heterogeneous such that different nodes may include different amounts of resources available for consumption of job instances. To this effect, in various implementations, application placement component 210 can select the nodes for job instances, based on determining whether the job instances have sufficient resources on their corresponding nodes for utilization demanded by the job instances.

Effective placement of job instances may then entail, in part, ensuring that one or more job instances are placed on a node such that each placed job instance has sufficient resources on the node. In some cases, this includes determining utilization of resources on nodes and comparing the utilization to the capacity of the nodes to determine available capacity. Available capacities may be compared to the utilization demands of jobs instances being placed to determine whether the available capacities are sufficient to accommodate the job instances. However, it is noted that placement rules for capacity are not required for resource balancing purposes. For example, at least some client defined resource metrics may correspond to essentially limitless resources that can still be balanced by the system.

Other examples of placement rules include upgrade or domain placement rules. As an example, placement rules may dictate refraining from placing primary job instances of a service application on the same upgrade domains and/or fault domains as secondary job instances of the service application. By refraining from placing primary job instances of a service application on the same upgrade domains and fault domains as secondary job instances of the service application, it can be ensured that a single hardware failure cannot take out all primary and secondary jobs instances, even during an upgrade to the service application.

An "upgrade domain" generally represents a maximum portion of a service application, or class of tenant thereof that can be made unavailable without substantially degrading the performance of the service application. Typically, the constraints (e.g., particular of job instances or percentage of total service application) of the update domains are articulated by a service model (e.g., service level agreement (SLA)) established for the service application. A client defined upgrade domain is typically defined to ensure a service application stays up and running, while undergoing an update of the application. A system defined upgrade domain is typically defined to ensure a service application stays up and running while one or more system components are undergoing an update. In one instance, an update domain is defined as the maximum percentage unit (e.g., 10% representing 10 VMs of a total of 100 VMs on which instances of a job are running) of a service application that may be taken down at once, per the service model, when an update is in progress. Once the update is finished, the VMs of a particular update domain are brought back online and another update domain is targeted for being taken offline. Generally, this process of iteratively addressing one update domain at a time is not visible to the client.

Thus, placement rules may dictate that job instances are distributed into multiple upgrade domains, with each upgrade domain as a logical unit of a deployment. Upgrading a deployment, may then be carried out one upgrade domain at a time. In performing an upgrade, job instances running in an upgrade domain may be stopped, updates may be applied, and job instances may subsequently be restored, followed by repeating the steps for other upgrade domains. An upgrade may be completed when all upgrade domains corresponding to the update are processed. By stopping only job instances running within one upgrade domain, in can be ensured that an upgrade takes place with the least possible impact to the running service application.

A "fault domain" generally represents a number of hardware-failure units (e.g., racks, physical hosts, data centers, etc.) over which a service application should be distributed in order to promote resilience upon the cloud computing platform experiencing an internal crash or upon a data center experiencing a contained equipment failure. A fault domain may correspond to a single point of failure in the cloud computing platform. By identifying/organizing fault domains and providing placement rules accordingly, the platform can prevent a single point of failure from taking out a service application. For example, placement rules may dictate that primary job instances are to be placed on different fault domains than secondary job instances. A computer by itself connected to a power outlet may be considered a fault domain where if the connection fails the computer is down. Further, a rack of computers in a datacenter can be a fault domain since a power outage of a rack may take out the collection of hardware in the rack. Typically, placement rules regarding fault domains may be system defined placement rules and clients may optionally opt out of such placement rules.

Other examples of placement rules are geographic placement rules. For example, a client may define placement of job instances with respect to one or more particular datacenters, regions, countries, etc. As an example, a client may provide a placement rule that primary job instances be placed in data centers located in Boston, since the client is located in Boston. Secondary job instances could have different placement rules related to geography or could be left unrestricted in this respect.

As another example, placement rules can comprise placement constraints corresponding to Boolean rules controlling service application placement relative to a set of nodes. Placement constraints may be employed, for example, to enforce hardware demands of job instances. For example, a client may define a placement rule which dictates that one or more job instances be placed on a node that includes one or more defined types of hardware. As an example, a service application may require a particular type of hardware (e.g., CPU or CPU) to run. As another example, for testing purposes, the client may specify to run the service application on a particular hardware configuration. A client may define one or more hardware demands, such as HasDisk=0 (no hard disk) and MemorySize>=8192 (RAM greater than or equal to 8192 MB) for each job(s) of a service application and/or instances thereof. The system may maintain hardware configuration logs of the nodes on the platform for cross reference with hardware demands of job instances.

Another example of a placement rule is a scale out count rule. A scale out count rule can constrain an application service from running on more than a designated number of nodes. A scale out count may be suitable for service applications that have high creation cost that can be amortized across other instances. Using a scale out count, some services may be more spread out amongst nodes, granting more resources, while others may be bunched up, granting fewer resources. In some cases, a scale out count of a placement rule can to change dynamically based on time. For example, a service application may have a larger scale out count during a night time period than during a day time period. This can be employed, for example, where a service application utilizes batch processing at night, while being on front ends during the day.

Another type of placement rule corresponds to a service aversion rule. A service aversion rule can correspond to a placement policy that specifies placement aversions of one or more service applications (or job instances) with respect to one or more other service applications (or job instances). For example, a service aversion rule may specify that job instances of a first client are not to be placed on the same machine, node, or rack as job instances of a second client. Such a feature may be desirable, for example, where the two clients represent competing corporations. As another example, instead of restricting job instances of the second client, a service aversion rule may be generalized to all other clients, or multiple clients. Thus, a service aversion rule may specify that the job/application instances are to have a dedicated machine, node, or rack. As another example, service aversion rules may in addition or instead be with respect to job instances and/or service applications of the same client.

A further example of placement rule corresponds to a service affinity rule. Service affinity rules may be the converse of service aversion rules in that a service affinity rule can correspond to a placement policy that specifies placement affinities of one or more service applications (or job instances) with respect to one or more other service applications for job instances). For example, a service affinity rule may specify that job instances of a service application are to be placed on the same machine, node, or rack as job instances of a second service application. Such a feature may be desirable to provide physical proximity between job instances and/or service application instances.

Thus, in various implementations, the system and clients can define placement rules for job instances and resource metrics to be balanced by the cloud computing platform. Each client can define custom resource metrics and/or placement rules on a per service application, per job, or instances thereof, basis. Thus, application placement component 210 may have a large number of factors to consider in selecting suitable job instance placements. Further complicating matters, the factors for consideration can mange dynamically both in value and quantity. Additionally, the cloud computing platform can be in constant flux with job instances, nodes, machines, data centers, racks, and the like constantly being added to or removed from the system. As described in further detail below, application placement component 210 is capable of selecting placement plans for job instances that effectively address these factors in a suitable amount of time and utilizing a suitable amount of computing resources.

In accordance with implementations of the present disclosure, application placement component 210 is configured to generate one or more placement plans for job instances using an online algorithm capable of providing effective solutions despite the dynamism in the cloud computing platform. Application placement component 210 may optionally select a candidate placement plan for execution on the cloud computing platform.

Application placement component 210 may generate a placement plan, for example, based on job instances, such as job instances 224c and 220d being instantiated on the cloud computing platform. However, at least some of the job instances may have already been instantiated and placed on nodes. For example, application placement component 210 may at least attempt to generate a placement plan based on detecting imbalance of one or more resources in the cloud computing environment as exceeding a threshold value. The imbalance may be with respect to one or more nodes (e.g., based on detection of one or more hot nodes with respect to one or more resources) or the system overall.

Further, application placement component 210 may generate a placement plan where one or more nodes no longer comprise sufficient resources to host one or more job instances. For example, the resources of the node may change or the demands of one or more job instances may change. As a further example, application placement component 210 may generate a placement plan where one or more nodes become unavailable to serve one or more job instances, for example, by being taken offline intentionally or due to failure (e.g., node 216).

In yet other cases, application placement component 210 may generate a placement plan where one or more placement rules are violated for one or more job instances on one or more nodes. For example, the client may add a new service aversion rule that is violated on a node, requiring eviction of one or more job instances for compliance. As a further example, application placement component 210 may generate a placement plan time to time, such as on a periodic basis. As application placement component 210 may not always generate optimal placement plans, periodic generation can provide more optimal job instance placement. These and other factors are contemplated as being potential impetuses to generating and/or executing new placement plans.

Each candidate placement plan generated by application placement component 210 can comprise a set of movements of job instances with respect to nodes of the cloud computing platform that are operable to achieve a corresponding target placement of job instances on the nodes. In some implantations, a movement provides a new location (i.e., node) to a job instance. As indicated above, a movement may change the location of a previously placed job instance or may provide an initial location to a job instance.

A target placement may be considered a solution to placement of job instances on nodes of the cloud computing platform. Thus, the solution space being explored by application placement component 210 can comprise all possible target placements for the job instances. Due to the potentially large number of nodes and job instances that may be included in the system, the solution space being explored can be large. Thus, in some cases, prior to analyzing the solution space, solutions may be removed based analyzing their compliance with one or more of the placement rules. For example, solutions that result in noncompliance with one or more of or any of the placement rules may be removed from the solution space and resource balance may be subsequently accessed with respect to the remaining solutions. However, due to the large number of placement rules that may be present, the act of removing the solutions from the solution space may be time and/or resource prohibitive.

Thus, in some implementations, invalid or insufficient solutions with respect to placement rules are not removed from the solution space prior to accessing resource balance of the solutions. Instead, application placement component 210 may select a target placement using a selection strategy. The selected target placement may be analyzed with respect to the placement rules. Where application placement component 210 determines that the target placement sufficiently complies with the placement rules, the target placement may be further analyzed with respect to balance of resource metrics. However, where a target placement fails to comply with a placement rule or otherwise is insufficient with respect to the placement rules, the target placement may be rejected as a solution and another target placement may be selected. Thus, application placement component 210 need not perform extensive processing in order to remove all invalid solutions from the solution space. In some cases, the selection strategy used to select a target placement is a heuristic selection strategy. However, in various implementations, the selection of a target placement is random, thereby requiring negligible processing power.

In various implementations, selection of a target placement comprises selecting a solution neighbor to a previous target placement that corresponds to a previous placement plan (or the current placement of job instances on the platform). For example, a target placement may be generated by one or more of adding a movement to a placement plan (or selecting an initial movement), removing a movement from the placement plan, and/or changing a movement in the placement plan to result in a modified placement plan corresponding to a modified target placement. These movements may be selected using the selection strategy, for example, by selecting one or more random movements to modify the placement plan. It is noted that in some cases, a modification may be limited to a single addition, removal, or change of a movement for determining a new target placement. Further, candidate placement plans may be limited to a predefined number of movements, thereby preventing further addition of movements to a plan.

In some respects, a target placement may be analyzed with respect to resource balance. For example, target placements that sufficiently comply with placement rules may be analyzed. A target placement may be rejected and a new target placement may subsequently be selected based on the analysis, or the analysis may result in acceptance of the target placement (along with its candidate placement plan). In some implementations, resource balance is quantified using one or more balance scores that quantify the balance of one or more of the resources defined by the resource metrics. Using balance scores, it can be determined whether the target placement improves, diminishes, or maintains balance with respect to one or more resources of the cloud computing platform.

In some implementations, application placement component 210 calculates a resource balance score for each resource metric that quantifies the balance of the resource represented by the resource metric. A balance score for a resource metric may be based on dividing the standard deviation of the resource utilization on the nodes by the average of the resource utilization on the nodes. A more balanced target placement may then reduce the average standard deviation of the resource utilization with respect to the nodes. As an example, for each metric a balance score may be calculated using equation 1:

$$BalanceScore_i = \frac{Stdev_{j \in nodes}(m_{ij})}{Average_{j \in nodes}(m_{ij})},$$

where i represents the $i^{th}$ resource metric being evaluated and j represents the $j^{th}$ node in an evaluation.

In some cases, application placement component 210 calculates an aggregate balance score that quantifies the overall balance of resources on the cloud computing platform. Calculating an aggregate balance score can comprise combining balance score for each resource metric (e.g., determined using equation 1). In some cases, balance scores of resource metrics are weighted based on priorities associated with the resource metrics. Higher priority resource metrics may receive a higher weighting in the aggregate balance score. In some cases, clients can specify the priority of the resource metrics. For example, as previously described above, a client may provide a priority for a resource metric while designating that resource metric for a service application or job (or instance thereof). In various implementations, priorities may be provided by clients for client defined and/or system defined resource metrics. Thus, different clients may have different priorities for similar resource metrics. As an example, an aggregate balance score may be calculated using equation 2:

AggregateBalanceScore=$\Sigma_{i=1}^{n} w_i$*BalanceScore$_i$, where i represents the $i^{th}$ resource metric, and w represents the current the weight of the resource metric and n represents the total number of resource metrics being evaluated.

Although a balance score (e.g., aggregate balance score) may indicate that a target placement improves a previous target placement and/or the current state of system with respect resource balance, the target placement may still be rejected by application placement component 210. A target placement may still be rejected, for example, based on the cost of executing a placement plan corresponding to the target placement (e.g., based on comprising the cost with the previous target placement and/or the current state of system). In some cases, the cost of the placement plan is factored into a placement score along with the balance score (e.g., aggregate balance score). However, as used herein, a placement score may generally refer to a score that quantifies a state of the cloud computing platform (e.g., generated from a placement metric) and does not require cost as a factor. In some case an aggregated balance score or other balance score may be used as a placement score. As a specific example, a placement score may be calculated using equation 3:

$$PlacementScore = AggregateBalanceScore * \left(1 + \frac{Cost}{MaxCost}\right),$$

where Cost represents the cost of the target placement and MaxCost represents the total possible cost of any target placement.

In the present example, Cost may be defined as the number of movements in the set of movements of the placement plan and MaxCost may be defined as the number of job instances in the cloud computing platform. However, this is a simplified example of one suitable approach for factoring cost into a placement score. It will be appreciated that different movements can have different amounts of impact on the overall cost. For example, movements between data centers may increase cost more than movements within a data center. Further, movements may have varying amounts of cost depending on which node, rack, data center, region, and/or country the movement is to.

In some respects, a plurality of candidate placement plans and corresponding target placements may be generated and selected prior to selecting a candidate placement plan for execution on the cloud computing platform. For example, candidate placement plans can be iteratively be generated from one another and analyzed. An initial candidate placement plan may be generated from a current placement state of job instances on the nodes and can evolve as movements are iteratively added to, removed from, or changed. Iteration may cease based on any combination of possible factors. For example, iteration may cease based on the number of movements in a candidate movement plan exceeding a threshold value. In addition, or instead, iteration may cease based on elapsed time in generating the candidate solution plans. In addition, or instead, iteration may cease based on application placement component 210 determining that a generated candidate placement place has a corresponding target placement that improves resource balance on the nodes of the platform (e.g., greater than a threshold amount).

A candidate placement plan may optionally be selected for execution on the cloud computing platform based on comprising a predicted state of the cloud computing platform to the current state of the cloud computing platform. The predicated state may correspond to the placement score, aggregated balance score, or other score corresponding to the target placement that can be achieved by the candidate placement plan. The current state of the cloud computing platform may correspond to the placement score, aggregated balance score, or other score computed for the current placement of job instances on the platform (e.g., the cost in equation 3 may be 0 as no movements are required). A candidate placement plan may be selected and executed based on application placement component 210 determining that the candidate placement plan would improve the state of the platform with respect to the score. The candidate placement plan may otherwise be discarded.

In determining whether to accept or reject a target placement and/or its candidate placement plan, some approaches may include rejecting any target placements that diminish the aggregate balance score or the placement score. However, where this approach is always followed, application placement component 210 may be prone to being confined to local maxima in the solution space. In these cases, a more optimal solution (e.g., a global maxima) may exist, but is not reached in iterating through target placements as the reference score (e.g., the aggregate balance score or the placement score) that serves as the basis for comparison may need to diminish the state of the system represented by the score prior to achieving a higher/improved score.

In this way, selecting target placements may be considered a hill climbing problem that seeks to overcome local maxima. Thus, in some cases, in iterating through target placements, application placement component 210 may accept one or more target placements despite its selection criteria indicating a diminishment to the state of the cloud computing platform relative to the previously selected target placement.

In some cases, application placement component 210 can overcome local maxima using a simulated annealing algorithm or other hill climbing algorithm that uses the placement score as its energy function. The simulated annealing algorithm may accept any target placement (and associated candidate placement plan) that improves or maintains the placement score. Where the target placement diminishes the placement score, the target placement may still be accepted. For example, application placement component 210 may probabilistically accept at least one target placement that diminishes the placement score based on a probability function of the simulated annealing algorithm. As a specific example, the probability of accepting a target placement can be represented using equation 4:

$$Prob(\mathit{diff}, T) = \begin{cases} 1 & \text{if } (\mathit{diff} > 0) \\ e^{\frac{\mathit{diff}}{T}} & \text{if } (\mathit{diff} \leq 0) \end{cases},$$

where diff is a difference between the placement score of the target placement being considered and the placement score of the previous target placement, and T is the temperature parameter of the simulated annealing algorithm.

Using an annealing schedule that dictates the value of T, the placement score may trend down for a period of time and subsequently require better and better placement scores for acceptance of target placements in order to reach a new local maxima. As an example, T may gradually decrease. In some cases, the new local maxima may be worse than the current state of the cloud computing platform. In this case, the candidate placement plan corresponding to the current target placement may be rejected and the simulated annealing algorithm can be repeated until a more optimal candidate placement plan is generated. In this way, application placement component 210 may forecast the state of the cloud computing platform by exploring the solution space and implement candidate placement plans so that the state is maintained with sufficiently optimal placement of job instances, without requiring optimal placement of the job instances.

Figure 3:
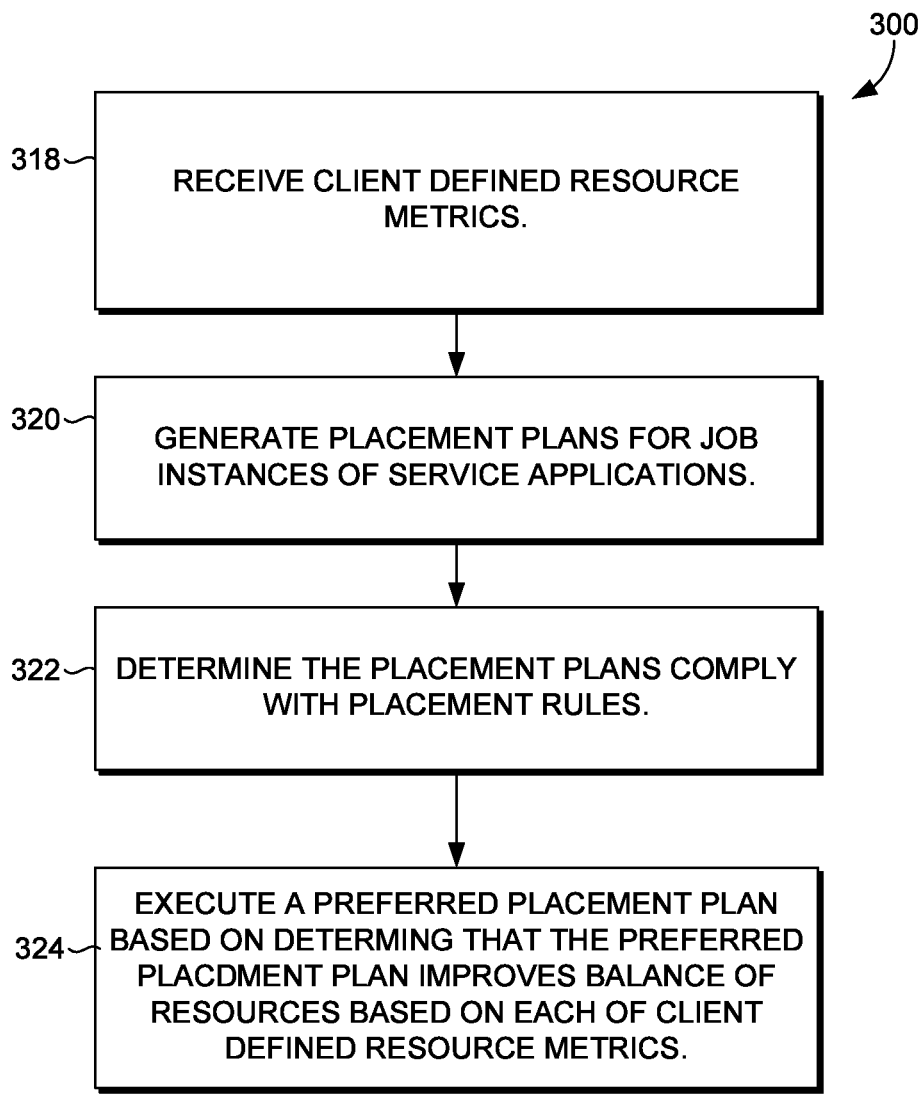
FIG. 3 is a flow diagram showing an exemplary method for resource balancing, in accordance with embodiments described herein.

Referring now to FIG. 3 with FIGS. 1 and 2, FIG. 3 is a flow diagram showing method 300 for resource balancing a cloud computing platform. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 318, method 300 includes receiving client defined resource metrics. For example, application placement component 210 can receive client defined resource metrics 232b that each represent a respective resource of nodes of cloud computing platform 110. In some implementations, the client defined resource metrics are received in one or more network communications from one or more client devices. For example, clients can designate client defined resource metrics in one or more messages that allocate corresponding resources to service applications and/or job instances. In addition, or instead, client defined resource metrics may be received from one or more job instances running on nodes. For example, the job instances may provide utilization demands for one or more resources that indicate corresponding resource metrics.

At block 320, the method includes generating placement plans for job instances of service applications. For example, application placement component 210 can generate placement plans for job instances of service applications, the placement plans each comprising one or more movements that are executable to achieve a corresponding target placement of the job instances on the nodes.

In some cases, the placement plans may be generated based on a resource balancing threshold. For example, application placement component 210 may seek to balance resources on nodes 212, 214, and 218 where at least one balance indicator score exceeds the resource balancing threshold. In some embodiments, a balance indicator score is calculated as the ratio between the maximally utilized node to the minimally utilized node. For example, a balance indicator score may be calculated for each resource or may correspond to an aggregate of resources. As an example, resource balancing may be performed where at least one of the resource balance indicators exceeds the resource balancing threshold.

In addition, or instead, the placement plans may be generated based on application placement component 210 receiving one or more new job instances to place, such as job instances 224c and 220d. The new job instances may be from a workload request provided by a client using a client device.

As a further example, one or more nodes may have failed, such that job instances on those nodes need to be relocated. As an example, node 216 may have failed or may be scheduled for a system update, as shown. Thus, application placement component 210 may generate new placement plans that include placements of job instances 224a and 224b on other nodes.

As a further example, one or more nodes may have failed, such that job instances on those nodes need to be relocated. As an example, node 216 may have failed or may be scheduled for a system update, as shown. Thus, application placement component 210 may generate new placement plans that include placements of job instances 224*a* and 224*b* on other nodes.

As yet another example, utilization demands of one or more job instances may have changed after being placed on nodes. For example, job instances may provide utilization demands to application placement component 210 that would result in an imbalance in resources. As another example, a client may change utilization demands for one or more of the placed job instances by changing their resource designations.

Each generated placement plan may comprise a set of movements that are executable to achieve a target placement of job instances on cloud computing platform 110 from a current state of the cloud computing platform. For example, the movements may add, remove, and/or replace job instances on nodes.

At block 322, method 300 comprises determining that the placement plans comply with placement rules. For example, application placement component 210 may determine that placement plans comply with placement rules, where each placement rule dictates whether a given job instance of the job instances is suitable for placement on a given node of the nodes. The placement rules can include client defined placement rules 230*b* and system defined placement rules 230*a*. As a specific example, a client defined placement rule may dictate that job instances of a particular service application or instance thereof must be placed on machines that have an NVIDIA® GPU. As another example, a system defined placement rule may dictate that primary job instances are not to be placed in the same fault domains as their corresponding secondary job instances.

Placement rules that do not comply with the placement rules may be discarded for consideration from being a preferred placement plan. By checking the placement plans for compliance after their generation, processing power can be saved as the non-compliant placement plans need not be removed from the solution space prior to selection.

As block 324, method 300 includes executing a preferred placement plan based on determining that the preferred placement plan improves balance of resources based on each of the client defined resource metrics. For example, a preferred placement plan may be selected from the generated placement plans by evaluating aggregated balance scores for target placements of job instances achieved by each placement plan. The aggregate balance score for each target placement may factor in all of the client defined resource metrics and any system defined resource metrics (e.g., at least all of the metrics representing resources allocated to at least one job instance on a node and/or designated for a job instance to be newly placed on a node). In some cases, the preferred placement plan may be selected based on having the highest placement score. The highest placement score may be based on the aggregated balance score, for example, as adjusted by costs associated with executing the corresponding placement plan.

Figure 4:
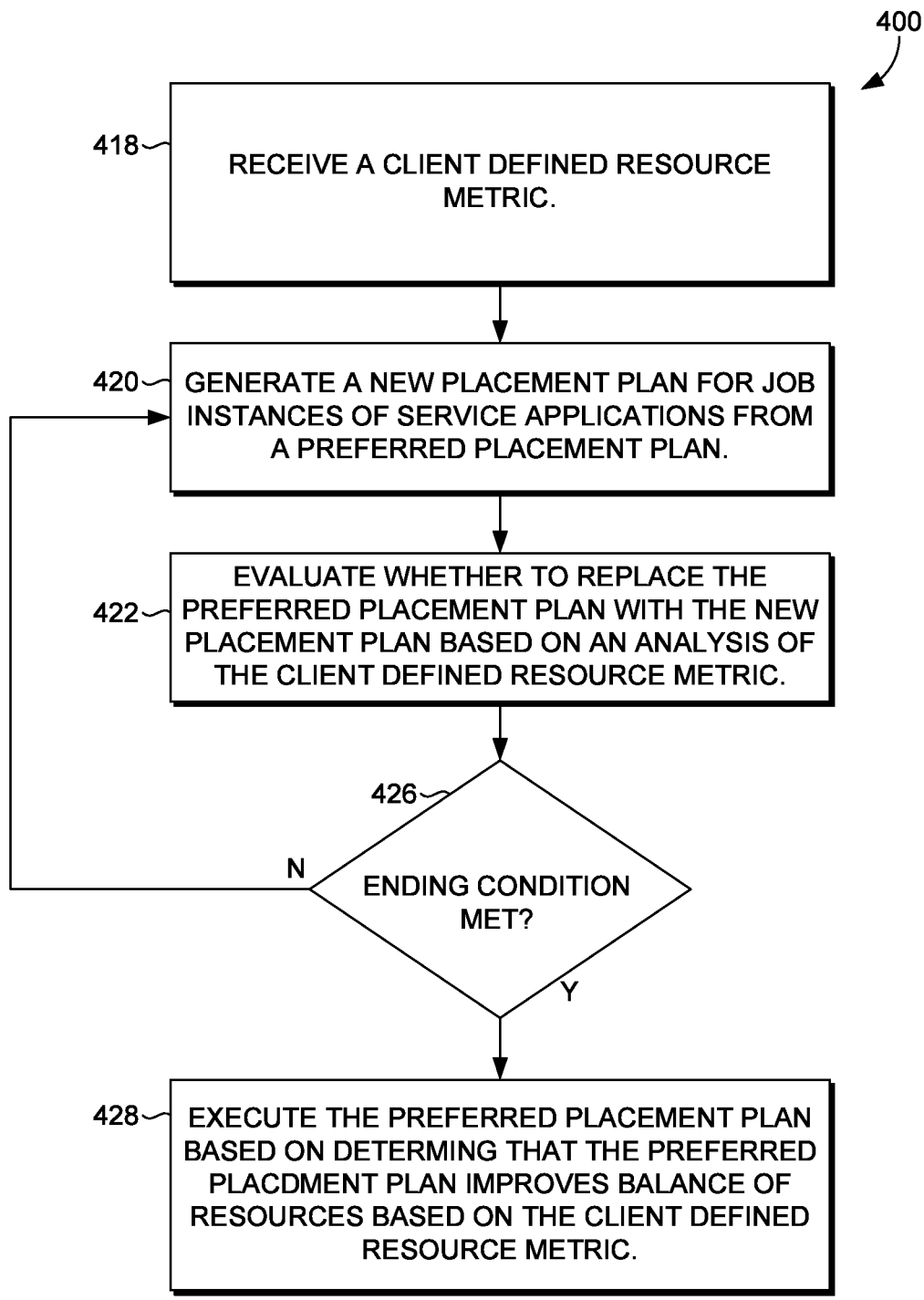
FIG. 4 is a flow diagram showing an exemplary method for resource balancing, in accordance with embodiments described herein.

Referring now to FIG. 4 with FIGS. 1 and 2, FIG. 4 is a flow diagram showing method 400 for resource balancing a cloud computing platform. At block 418, method 400 includes receiving a client defined resource metric. For example, application placement component 210 may receive client defined resource metrics 232*b*.

In some implementations, blocks 420 and 424 are executed as part of an iterative selection plan of a preferred placement plan that comprises one or more movements that are executable to achieve a target placement of job instances on nodes of the cloud computing platform, where blocks 420 and 424 are perform in each iteration by application placement component 210.

At block 420, method 400 includes generating a new placement plan for job instances of service applications from a preferred placement plan. The preferred placement plan may have been initially generated from a current placement of job instances on nodes of cloud computing platform 110. In some cases the new placement plan is generated by selecting a solution neighbor to the preferred placement plan using a selection strategy. The selection strategy could be random, as one example. A solution neighbor in each instance may be, for example, the set of movements of the preferred placement plan modified by one or more actions (only one action in some embodiments) randomly selected from removing a movement of a job instance to a node from the set, adding a movement of a job instance to a node to the set, and/or changing a movement of a job instance to a node from the set. The job instance and/or the node may also be randomly selected.

At block 422, includes evaluating whether to replace the preferred placement plan with the new placement plan based on an analysis of the client defined resource metric. For example, application placement component 210 may generate a placement score for each of the new and preferred placement plans and use the placement scores to determine whether to make the new placement plan the preferred placement plan. In some cases, the new placement plan replaces the preferred placement plan where the placement score is improved (or at least maintained) for the new placement plan. Further in some cases, the new placement plan is rejected, and the preferred placement plan is maintained where the placement score is diminished for the new placement plan. However, some implementations may be prone to selecting preferred placement plans with local maxima. Thus, in some cases, the new placement plan may still become the preferred placement plan even where the placement score is diminished for the new placement plan. As an example, a hill climbing algorithm may be employed to determine when to still perform the replacement. In some cases, this determination is based on a probability function, such as the one described in equation 4. Thus, the preferred placement plan may overcome local maxima in attempting to maximize the placement score by probabilistically accepting the new placement plan.

Block 426 of method 400 includes evaluating whether an ending condition is met. For example, application placement component 210 may perform a subsequent iteration of the iterative selection as long as an ending condition of the iterative selection is not met. Thus, blocks 422 and 424 may be repeated until the ending condition is met. For each time blocks 422 and 424 are repeated, the preferred placement plan may have changed from a previous iteration or may have stayed the same where a new placement plan was rejected.

The ending condition can include various factors. In some cases, the ending condition is based, at least in part on run time of preferred placement plan selection. For example, application placement component 210 may limit the time for preferred placement plan selection so that the algorithm does not take too long, as the state of the platform may change in that time. Another factor could be based on the amount of improvement to the placement score between the current preferred placement plan and the current state of the platform (e.g., where the improvement or score exceeds a threshold amount). As another example, the ending condition can be based on application placement component 210 determining that the preferred placement plan has converged. These and other factors may be considered as ending conditions.

At block 428, method 400 includes executing the preferred placement plan based on determining that the preferred placement plan improves balance of resources based on the client defined resource metric. For example, application placement component 210 can evaluate an aggregated balance score for the preferred placement plan and the current state of the system. The aggregate balance scores may each factor in all of the client defined resource metrics and any system defined resource metrics (e.g., at least all of the metrics representing resources allocated to at least one job instance on a node and/or designated for a job instance to be newly placed on a node). Further, the aggregated balance score of the application placement component 210 may be used to generate a placement score that includes costs associated with executing the plan and may be executed where the placement score improves (or is at least maintained) with respect to the current state of the system. However, in some cases, cost may not be factored into the placement score. Thus, it will be appreciated that after selecting the preferred placement plan, the system may maintain the current placements on job instances on the nodes, or may adopt the target placements achieved by the preferred placement plan.

Figure 5:
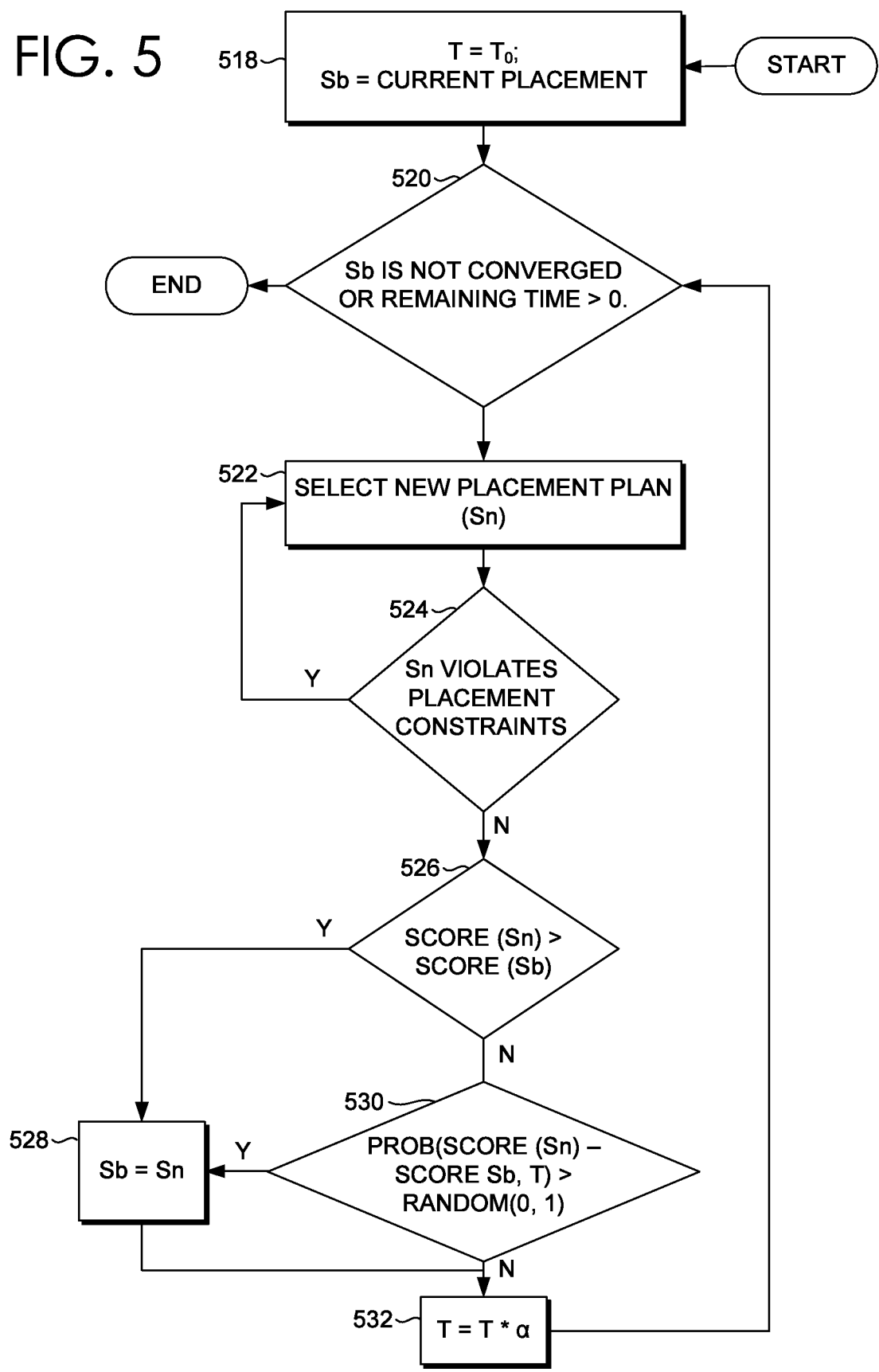
FIG. 5 is a flow diagram showing an exemplary method for resource balancing, in accordance with embodiments described herein.

Referring now to FIG. 5 with FIGS. 1 and 2, FIG. 5 is a flow diagram showing method 500 for resource balancing a cloud computing platform. In particular, method 500 shows an implementation for selecting a preferred placement plan that employs a simulated annealing algorithm. The simulated annealing algorithm may optionally use equation 3 as an energy function and equation 4 as a probability function. Method 500 may be performed by application placement component 210 to generate and select a preferred placement plan.

At block 518, the temperature T is set to an initial value and the preferred placement plan is set to the current placement of job instances on the cloud computing platform. At block 520, it is evaluated whether the preferred placement plan has converged or whether there is no remaining time for selecting the preferred placement plan. It will be appreciated that this evaluation need not be made at this point the sequence of blocks shown, and may be made elsewhere. If either of the ending conditions in block 520 are met, method 500 may end. Otherwise, method 500 can proceed to block 522.

At block 522 a new placement plan is generated. For example, the new placement plan Sn may be a randomly selected solution neighbor of the preferred placement plan Sb. A solution neighbor may be defined in terms of permitted modifications that may be randomly selected from to alter the preferred placement plan and the same permitted modifications may be randomly selected from each time block 522 is performed.

At block 524, method 500 includes evaluating whether the new placement plan Sn violates any placement rules (e.g., any of placement rules 230). Where the new placement plan Sn does violate a placement rule, it may be discarded or rejected and replaced in block 522 until a new placement plan Sn is generated that does not violate any placement rules. In this way, method 500 may ensure that the preferred placement plan that it outputs complies with the placement rules. Further, non-compliant new placement plans may be discarded at this point to save processing power, however, in some cases a new placement plan may be discarded later.

As block 526, method 500 includes evaluating whether the placement score of the new placement plan Sn is greater than the placement score of the current preferred placement plan Sb. The placement scores may be generated using equation 3. Where the new placement plan Sn improves or at least maintains the placement score, it may be made the preferred placement plan at block 528, as shown. Otherwise, as indicated by block 530, the new placement plan Sn may still be made the preferred placement plan subject to a probability function that is based on a difference between the placement scores of the new and preferred placement plans.

At block 532, method 500 includes updating the temperature T used in the simulated annealing algorithm. The updated temperature T can be used in subsequent iterations unless ending conditions are met at block 520. It will be appreciated that temperature T need not be updated in cases were the ending conditions are not met. Thus, method 500 provides preferred placement plan Sb which may further be evaluated by application placement component 210 to determine whether to execute the plan on cloud computing platform 110.

Figure 6:
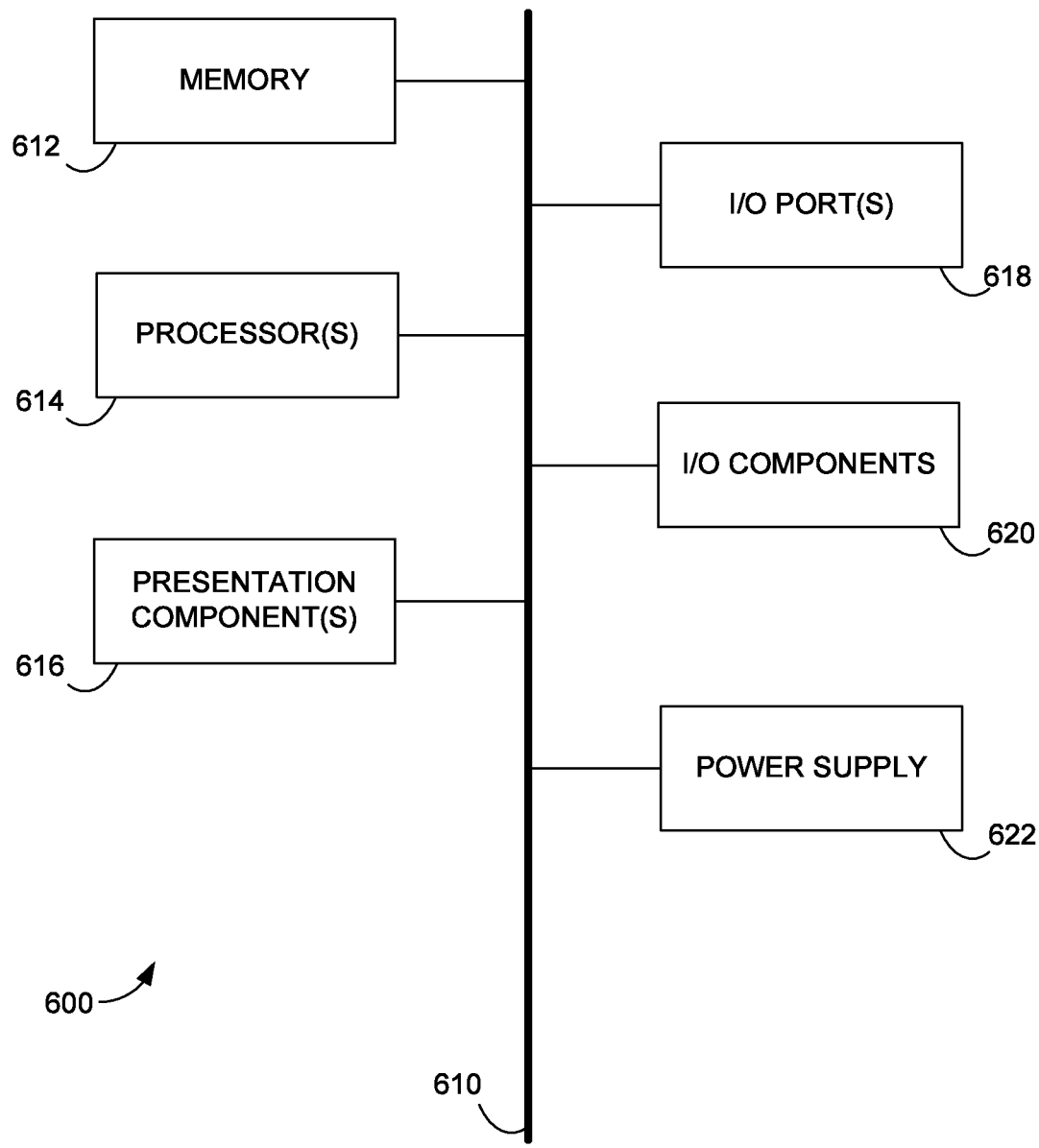
FIG. 6 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented system for resource balancing, the system comprising:
   one or more hardware processors; and
   one or more computer-readable media having executable instructions embodied thereon, which, when executed by the one or more hardware processors, cause the one or more hardware processors to perform a method comprising:
      receiving an indication to move a plurality of job instances between two or more nodes in a cloud computing platform;
      generating a plurality of placement plans for moving the plurality of job instances, wherein a placement plan comprises a set of movements of job instances for moving at least a subset of the plurality of job instances to corresponding locations in the two or more nodes, wherein each location of the plurality of job instances after the set of movements is defined as a target placement for the corresponding job instance;
      comparing a first placement plan to a second placement plan using a multi-factor score defined for each of the first placement plan and the second placement plan, wherein the multi-factor score is defined based on cost as a first factor and resource balance as a second factor, wherein the cost is defined based on a number of movements of the plurality of job instances and wherein the resource balance is defined based on a calculated balance in resource metrics of the two or more nodes associated with the plurality of job instances in their target placements;
      based on comparing the first placement plan to the second placement plan, selecting the first placement plan; and
      executing the first placement plan.

2. The computer-implemented system of claim 1, wherein the first placement plan is generated as part of a simulated annealing algorithm that calculates results of an energy function of the simulated annealing algorithm respectively from target placements of the plurality of placement plans and outputs the first placement plan based on the results.

3. The computer-implemented system of claim 1, wherein the method further comprises removing a subset of placement plans from the plurality of placement plans prior to comparing the first placement plan to the second placement plan based on the multi-factor score.

4. The computer-implemented system of claim 1, wherein the method further comprises:
   generating an intermediate placement plan for the job instances;
   determining that the intermediate placement plan complies with placement rules;
   probabilistically replacing a previously preferred placement plan for the job instances with the intermediate placement plan, wherein the intermediate placement plan diminishes the multi-factor score with respect to the previous preferred placement plan; and
   replacing the intermediate placement plan with the previous preferred placement plan for the executing.

5. The computer-implemented system of claim 1, wherein the method further comprises receiving, from the particular client, a designation of a subset of client defined resource metrics to a particular job instance of the job instances wherein, at least one of a plurality of reports is from the particular job instance and specifies the utilization for the subset of the client defined resource metrics by the particular job instance based on the designation.

6. The computer-implemented system of claim 1, wherein the method further comprises:
receiving client defined placement rules from a plurality of clients; and
including the client defined placement rules in the placement rules with system defined placement rules.

7. A computer-implemented method for resource balancing, the method comprising:
receiving an indication to move a plurality of job instances between two or more nodes in a cloud computing platform;
generating a plurality of placement plans for moving the plurality of job instances, wherein a placement plan comprises a set of movements of job instances for moving at least a subset of the plurality of job instances to corresponding locations in the two or more nodes, wherein each location of the plurality of job instances after the set of movements is defined as a target placement for the corresponding job instance;
comparing a first placement plan to a second placement plan using a multi-factor score defined for each of the first placement plan and the second placement plan, wherein the multi-factor score is defined based on cost as a first factor and resource balance as a second factor, wherein the cost is defined based on a number of movements of the plurality of job instances and wherein the resource balance is defined based on a calculated balance in resource metrics of the two or more nodes associated with the plurality of job instances in their target placements;
based on comparing the first placement plan to the second placement plan, selecting the first placement plan; and
executing the first placement plan.

8. The computer-implemented method of claim 7, wherein the generating of the placement plan is based on determining that an insufficient placement plan for the job instances violates at least one placement rule of a plurality of placement rules.

9. The computer-implemented method of claim 7, wherein the executing is based on determining that a placement score of the placement plan exceeds a placement score of a previous placement plan for the job instances.

10. The computer-implemented method of claim 7, further comprising:
generating an intermediate placement plan for the job instances;
determining that the intermediate placement plan complies with a placement rule of a plurality of placement rules;
probabilistically replacing a previous placement plan for the job instances with the intermediate placement plan, wherein the intermediate placement plan diminishes a placement score with respect to the previous placement plan;
replacing the intermediate placement plan with the previous placement plan for the executing.

11. The computer-implemented method of claim 7, wherein receiving a client defined resource metric comprises a client designating the client defined resource of the resource metric to one or more job instances using a resource metric identifier.

12. The computer-implemented method of claim 7, wherein the executing the first placement plan is further based on evaluating a cost of the executing the first placement plan.

13. The computer-implemented method of claim 7, wherein the generating the first placement plan comprises modifying at least one movement of a previously generated placement plan.

14. The computer-implemented method of claim 7, wherein the first placement plan is generated as part of a simulated annealing algorithm that calculates results of an energy function of the simulated annealing algorithm respectively from target placements of placement plans and outputs the first placement plan based on the results.

15. The computer-implemented method of claim 7, wherein determining that a target placement of the job instances improves a balance score of at least the client defined resource across the nodes of the cloud computing platform is further based on a resource of the nodes represented by a system defined resource metric.

16. A computer-implemented system for resource balancing, the system comprising:
one or more hardware processors; and
one or more computer-readable media having executable instructions embodied thereon, which, when executed by the one or more hardware processors, cause the one or more hardware processors to perform a method comprising:
receiving an indication to move a plurality of job instances between two or more nodes in a cloud computing platform;
generating a plurality of placement plans for moving the plurality of job instances, wherein a placement plan comprises a set of movements of job instances for moving at least a subset of the plurality of job instances to corresponding locations in the two or more nodes, wherein each location of the plurality of job instances after the set of movements is defined as a target placement for the corresponding job instance;
comparing a first placement plan to a second placement plan using a multi-factor score defined for each of the first placement plan and the second placement plan, wherein the multi-factor score is defined based on cost as a first factor and resource balance as a second factor, wherein the cost is defined based on a number of movements of the plurality of job instances and wherein the resource balance is defined based on a calculated balance in resource metrics of the two or more nodes associated with the plurality of job instances in their target placements;
based on comparing the first placement plan to the second placement plan, selecting the first placement plan; and
executing the first placement plan.

17. The computer-implemented system of claim 16, wherein a probability function determines whether to replace the second placement plan with the first placement plan when the analysis indicates that the first placement plan would diminish a placement score with respect to the second placement plan.

18. The computer-implemented system of claim 16, wherein the generating the first placement plan is by modifying the second placement plan and the first placement plan is the modified second placement plan.

19. The computer-implemented system of claim 16, wherein in each iteration, in generating the first placement plan, the method comprises:

generating at least one placement plan from the previous placement plan until a placement plan is generated that complies with placement rules that include client defined placement rules and system defined placement rules, wherein each placement rule dictates whether a given job instance of the job instances is suitable for placement on a given node of the nodes; and using the generated placement plan as the first placement plan.

* * * * *